United States Patent
Patterson et al.

(10) Patent No.: US 10,612,428 B1
(45) Date of Patent: Apr. 7, 2020

(54) COLLAPSIBLE VALVE BRIDGE ACTUATION SYSTEM FOR A RECIPROCATING PISTON MACHINE CYLINDER

(71) Applicants: Donald James Patterson, Ann Arbor, MI (US); George Schwartz, Canton, MI (US); Kevin Morrison, Ann Arbor, MI (US); Richard Belaire, Whitmore Lake, MI (US)

(72) Inventors: Donald James Patterson, Ann Arbor, MI (US); George Schwartz, Canton, MI (US); Kevin Morrison, Ann Arbor, MI (US); Richard Belaire, Whitmore Lake, MI (US)

(73) Assignee: Electro-Mechanical Associates, Inc., Ann Arbor, MI (US)

( * ) Notice: Subject to any disclaimer, the term of this patent is extended or adjusted under 35 U.S.C. 154(b) by 0 days.

(21) Appl. No.: 16/151,703

(22) Filed: Oct. 4, 2018

(51) Int. Cl.
| | |
|---|---|
| *F01L 1/18* | (2006.01) |
| *F01L 1/34* | (2006.01) |
| *F01L 1/04* | (2006.01) |
| *F01L 1/344* | (2006.01) |

(52) U.S. Cl.
CPC .............. *F01L 1/34* (2013.01); *F01L 1/04* (2013.01); *F01L 1/18* (2013.01); *F01L 2001/34486* (2013.01); *F01L 2101/00* (2013.01)

(58) Field of Classification Search
CPC ....... F01L 1/04; F01L 1/18; F01L 1/34; F01L 2001/00; F01L 2001/34486

USPC ................. 123/90.12, 90.39, 90.44
See application file for complete search history.

(56) References Cited

U.S. PATENT DOCUMENTS

| | | | | |
|---|---|---|---|---|
| 5,982,269 | A  * | 11/1999 | Sorenson | H01H 73/26 200/553 |
| 8,267,057 | B2 * | 9/2012 | Schwitters | F01L 1/146 123/90.12 |
| 8,316,809 | B1 * | 11/2012 | Patterson | F01L 1/146 123/179.16 |
| 8,646,425 | B2 * | 2/2014 | Methley | F01L 1/14 123/90.12 |
| 9,453,437 | B2 * | 9/2016 | Patterson | F01L 1/34 123/90.16 |
| 9,611,767 | B2 | 4/2017 | Baltrucki | |
| 9,790,824 | B2 | 10/2017 | Baltrucki et al. | |
| 10,180,089 | B2 * | 1/2019 | Liskar | F01L 1/185 |
| 2005/0211206 | A1 | 9/2005 | Ruggiero et al. | |

* cited by examiner

*Primary Examiner* — Ching Chang
(74) *Attorney, Agent, or Firm* — Stanley E. Jelic

(57) ABSTRACT

A collapsible valve bridge actuation system that is configured to alter the lift of poppet valves in a reciprocating piston machine cylinder. The system has a rocker arm configured to be actuated by a cam lobe, and a collapsible valve bridge device that is functionally attached to the rocker arm. The device has a deactivation assembly that contains lock pins within a housing and springs. Also, the device is configured to remain rigid, partially collapse, or fully collapse. The extent of collapse is a function of the strength of the springs.

6 Claims, 4 Drawing Sheets

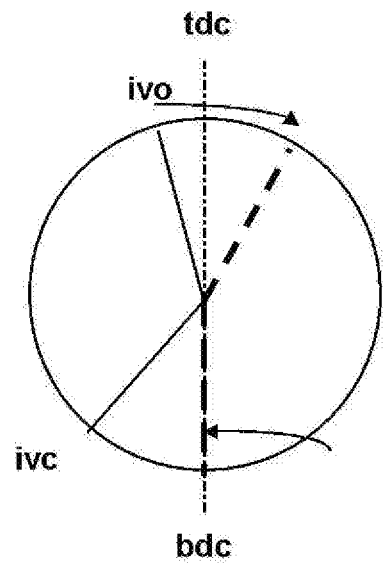
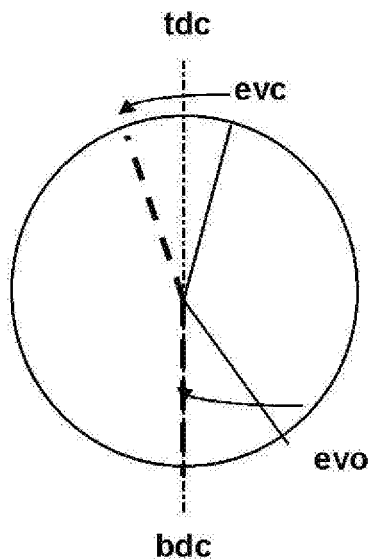
FIG. 3a
FIG. 3b
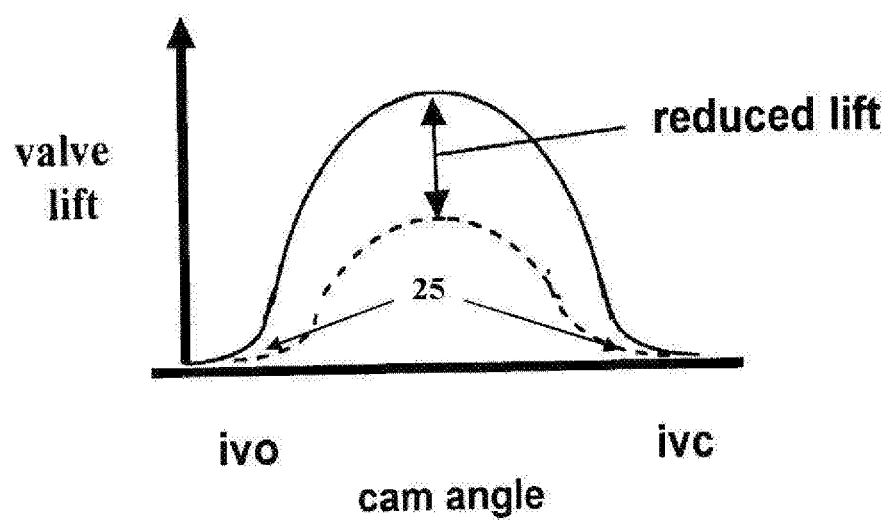
FIG. 4

COLLAPSIBLE VALVE BRIDGE ACTUATION SYSTEM FOR A RECIPROCATING PISTON MACHINE CYLINDER

FIELD

The present invention is in the technical field of reciprocating piston machine cylinders. More particularly, the present invention focuses on reciprocating piston machine valve activation on such machines having valve bridges acting upon two or more valves.

BACKGROUND

The statements in this section merely provide background information related to the present disclosure. Accordingly, such statements are not intended to constitute an admission of prior art. Poppet valves are widely used in Diesel engines, spark-ignited engines, and other reciprocating piston machines. Valve bridges are commonly used in engines with multiple valves. Diesel engines are widely used in heavy duty vehicles, light duty vehicles, electrical generators, and a variety of other applications. Engine design compression ratio is a compromise between power, economy, emissions, and cold startability. In Diesel engines, the optimum compression ratio for best fuel economy is less than 15:1, whereas the necessary compression ratio for cold starting ranges from 16:1 to 23:1 and depends on the specific design of the engine and its application. This compression ratio range is too high for best economy, lowest emissions and optimum power boost.

Typically, Diesel engines are sized larger than needed for the majority of their service in order to provide reserve power for excessive loads such as hill climbing or passing in the case of road vehicles or to support an unusually high power requirement in the case of stationary power generators or stationary refrigeration vehicles on an especially hot day. Consequently, much of the time the engine is operated at a fraction of its design power capability in particular applications involving extensive idling and/or light load operation such as military surveillance vehicles, idling refrigerator vehicles and stationary electric generators, etc.

SUMMARY

A collapsible valve bridge system improves the part and full load efficiency and provides other benefits for reciprocating piston machines by providing variable valve timing. A collapsible valve bridge actuation system configured to reduce or eliminate poppet valve lift of a reciprocating piston machine cylinder can comprise: a rocker arm configured to be actuated by a cam lobe; and a valve bridge that is functionally attached to the rocker arm; wherein the valve bridge comprises a collapsing device on which the rocker bears, further wherein the collapsing device comprises a deactivation assembly and is configured to remain rigid, partially collapse, or fully collapse upon command, and further wherein the valve bridge is functionally attached to the poppet valves.

In one embodiment, the Collapsible Valve Bridge (CVB) system comprises a modified valve bridge containing a Valve Bridge Collapser (VBC) section which incorporates a deactivation assembly that contains lock pins within a housing and springs. Under normal operating conditions, the lock pins lock the driver and the sleeve sections together to actuate the poppet valves with standard valve lift as provided by the cam lobe. Upon command, for example by oil pressure, the lock pins are retracted and the sleeve telescopes with respect to the driver, thereby reducing or eliminating valve motion. The extent of collapse is governed by the strength of the springs.

In a separate embodiment, the VBC device further incorporates a temperature sensitive bi-metal spring to actuate the lock pins to lock or unlock the driver and sleeve sections based on engine temperature.

In a separate embodiment, the VBC device further incorporates an electromagnetic mechanism to lock or unlock the driver and sleeve sections.

In a separate embodiment, the system further incorporates a damper that is functionally attached to the rocker arm and configured to slow the rate at which the poppet valves close.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

BRIEF DESCRIPTION OF THE DRAWINGS

Embodiments will now be described more fully with reference to the accompanying drawings in which:

FIG. 3a shows a typical intake valve timing diagram and the changes imparted by the CVB actuation system of later valve opening and earlier valve closing.

FIG. 3b shows a typical exhaust valve timing diagram and the changes imparted by the CVB actuation system of later valve opening and earlier valve closing.

FIG. 4 shows normal valve lift and partial lift produced by the CVB

DETAILED DESCRIPTION OF THE EMBODIMENTS

Figure 1:
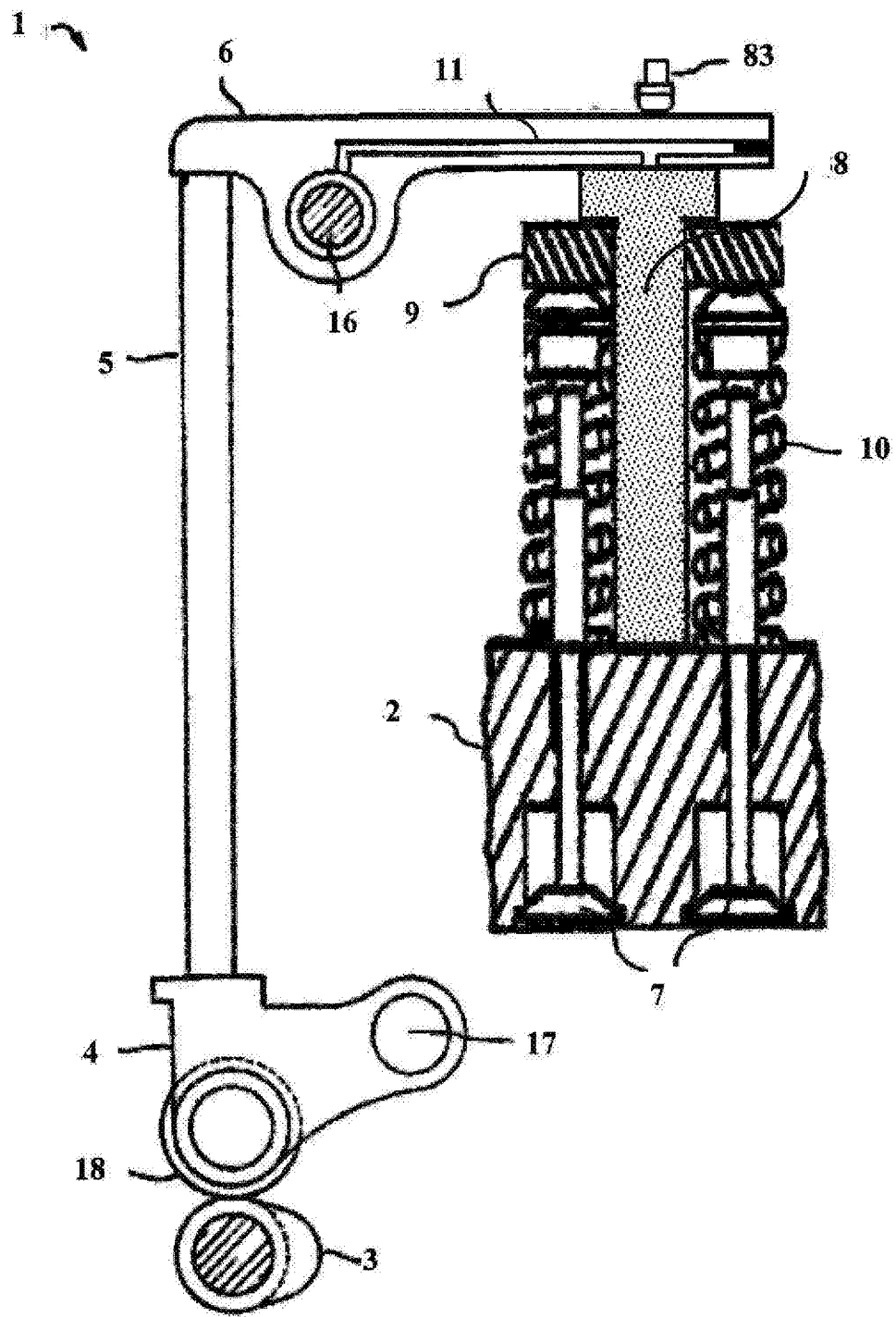
FIG. 1 is an overall view of the valve train of a valve bridge style, poppet valve engine with a CVB actuation system on one reciprocating machine cylinder. It includes optional damping.

The following detailed description of the invention is merely exemplary in nature and is not intended to limit the invention or the application and uses of the invention. Furthermore, there is no intention to be bound by any theory presented in the preceding background of the invention or the following detailed description of the invention.

A collapsible valve bridge actuation system for a reciprocating piston machine cylinder may be applied to a Diesel engine. Since the design compression ratio of 16:1 up to 23:1 for automotive and heavy duty Diesel engines is for starting conditions, sacrifices are made with regards to warm engine fuel economy, emissions, and optimum power boost. The best economy compression ratio for a warm engine may betas low as 15:1 or even lower. Hence, there exists a need to enable reduced automotive and heavy duty Diesel engine compression ratios, after the engine has been successfully started and warmed-up.

Since the engine power is larger than optimum for best economy under moderate load operation, cylinder cut-out or deactivation is desirable. This not only saves fuel, but lowers emissions as well. Hence, there exists a need to enable cylinder cut-out for some cylinders of a multi-cylinder engine under selected engine light to moderate load conditions.

Devices have been proposed for adjusting the valve timing of piston engines. Some are in production for spark-ignited engines. The inventors have previously patented two mode valve actuator devices applied to the Diesel engine, U.S. Pat. Nos. 8,316,809 B1 and 9,453,437 B2. These inventions which are incorporated either into the lifter or pushrod are based around a combination of both partly or totally deactivating valve lift and optionally damping the modified motion under selected conditions such as starting or light load operation. The collapsible valve bridge provides an alternate, and in the case of an engine with valve lifters that produce a swinging motion of the pushrods, a potentially better means to provide variable valve timing. Furthermore, the collapsible valve bridge can be retrofitted into an engine without cylinder head removal or other significant base engine modifications.

A number of Patents for Spark-Ignited (SI) engines that are based upon two-mode hydraulic valve lifter action have been issued to Delphi and General Motors (GM). These patents form the basis of the design for the GM Displacement On Demand (DOD) production engine system, for example the Delphi Patent by Hendriksma et. al. U.S. Pat. No. 7,395,792 B.

The contents of U.S. Pat. Nos. 8,316,809 B1 and 9,453,437 B2 are herein incorporated by reference in their entirety.

Variable valve lifting means have not been applied to the Diesel, as far as the inventors know, because of interference between the piston crown and valves if the cam timing itself is changed. Also, most mechanisms that vary the compression ratio are not useful for Diesel engines because of changes to the combustion chamber shape and thus to the combustion itself. The Diesel engine is not tolerant of changes to the combustion system in an otherwise optimized engine.

It is a common practice to close the intake valve up to or more than 60 crank angle degrees after the piston reaches bottom, dead center. This is, to enhance high speed engine power. But, this late closing reduces the effective compression ratio by 2 or 3 ratios depending on the intake valve closing angle. For example, a design ratio of 18:1 is needed to provide a suitable effective ratio of 15:1 because of late intake valve closing when the closing angle is 60 crank angle degrees.

To compensate for this reduced compression, the present disclosure describes a valve bridge mechanism, the CVB, which operates in either of two modes, normal valve lift, or modified valve lift. This means that the combustion chamber design remains optimized for fuel economy and emissions for normal running, but then the compression ratio is effectively raised and exhaust recycle increased via the CVB, when required, for example cold starting and warm-up, without affecting the geometry and performance of the combustion chamber or introducing mechanical interference.

One object of the present invention is to provide a means to lower the design compression ratio of the Diesel engine that will not diminish cold startability and optionally provide the ability to control valve train noise and vibration.

A second objective is to provide means to disable valve motion in order to deactivate a cylinder of a reciprocating piston machine.

Another objective of the present invention is to provide a two mode valve actuation system that provides higher compression for starting an engine, but a lower compression ratio for normal running.

Another objective is to deactivate some cylinders in order to operate an engine at reduced load with better fuel economy and lower emissions.

Another objective is to use the CVB to alternate deactivated cylinders during reduced load conditions to equalize machine wear.

Another, object, of the present invention is, to provide two levels of compression as a means to increase the fuel economy of the Diesel engine without sacrificing cold startability or creating excess noise and vibration.

Another object of the present invention is to allow an engine to operate at a lower compression ratio during warmed-up operation thus reducing engine-out CO2 emission as well as soot and hydrocarbon emissions without sacrificing cold startability.

Another, object, of the present invention is to improve fuel economy by allowing the use of the Miller Cycle which uses late intake valve closing during warmed-up engine operation without the loss of cold start or warm-up capability created by the reduced effective compression inherent with the Miller Cycle.

Another object of the present invention is to provide two or more levels of compression as a means to increase the power boost of the Diesel engine when operating at a lower design compression ratio without sacrificing cold startability.

Another object of the present invention is to provide two modes, of a valve bridge actuation system that can be incorporated into a reciprocating machine without significant redesign of the structure.

Another, object, of the present invention is to provide two modes of valve bridge actuation that can be retrofit into an existing engine design without significant modification of the engine.

Another object of the present invention is to provide a means for switching between two modes of valve bridge actuation from early intake valve closing for cold start and light load running to normal valve closing for other engine speeds and loads.

Another object of the present invention is to provide a means to disable valve motion totally in a reciprocating machine.

Another object of the present invention is to provide two modes of valve bridge actuation that retains controlled amounts of exhaust gases in the engine cylinder to facilitate, cold starting and cold drive-away.

Another object of the present invention is, to suggest key parameters for a control strategy for selecting the operating mode of a two mode, valve bridge actuation system with or without optional damping.

Another object of the present invention is to provide a two mode, valve bridge actuation system that is more universally functional in today's market than the prior art systems.

It is intended that any other advantages and objects of the present invention that become apparent or obvious from the detailed description or illustrations contained herein are within the scope of the present invention.

FIG. 1 illustrates a type of conventional valve train 1 modified to include the CUB components. As in a conventional valve-train, the cam 3 bears on the roller 18 which in turn rotates the lifter 4 which pivots on axle 17. The movement of the lifter 4 then moves the pushrod 5 which bears on rocker 6. In the normal mode when moved, the pushrod 5 causes the rocker arm 6 to rotate about pivot 16, thus moving VBC 8 to which it is functionally attached. VBC 8 when locked to the valve bridge 9 opens valves 7 in the normal manner. Valves 7 are functionally attached to cylinder head 2. The springs 10 preload the valves, thus keeping them tightly closed unless lifted by the cam 3. The VBC 8 is, described in detail in connection with FIG. 2. The CVB may contain, as needed, an element to provide soft opening of valves 7 under partial lost motion operation. The CVB may require a damper 83 which, if needed, provides a soft landing to valves 7 under partial lost motion operation. In the configuration providing total valve disabling such damping is irrelevant and not needed as no valve movement occurs. While FIG. 1 illustrates a valve train incorporating a pushrod, other valve train configurations such as those employing an overhead cam also cause rocker 6 to rotate and contact VBC 8 in the same manner.

In normal operation, the valve lifter 4 lifts the pushrod 5 causing the rocker arm 6 to rotate thus moving the valve bridge and opening valves 7. Applied to an engine for cold starting and perhaps other selected light load, low speed conditions as well as valve disabling; the VBC 8 comes into, play. Valve bridge collapser device 8 may be partially or totally telescoped so that it limits the lift of valves 7. When valve motion occurs, the optional damper 83 as well as damping within the collapsible valve bridge device 8 provide a smooth, quiet beginning and ending to the valve motion.

Lubricant oil passage 11 formed by a drilling in the rocker 6 provides an oil pressure control signal to change the operating mode by activating VBC 8. How oil pressure changes the VBC 8S operating mode is discussed in connection with FIG. 2.

Figure 2:
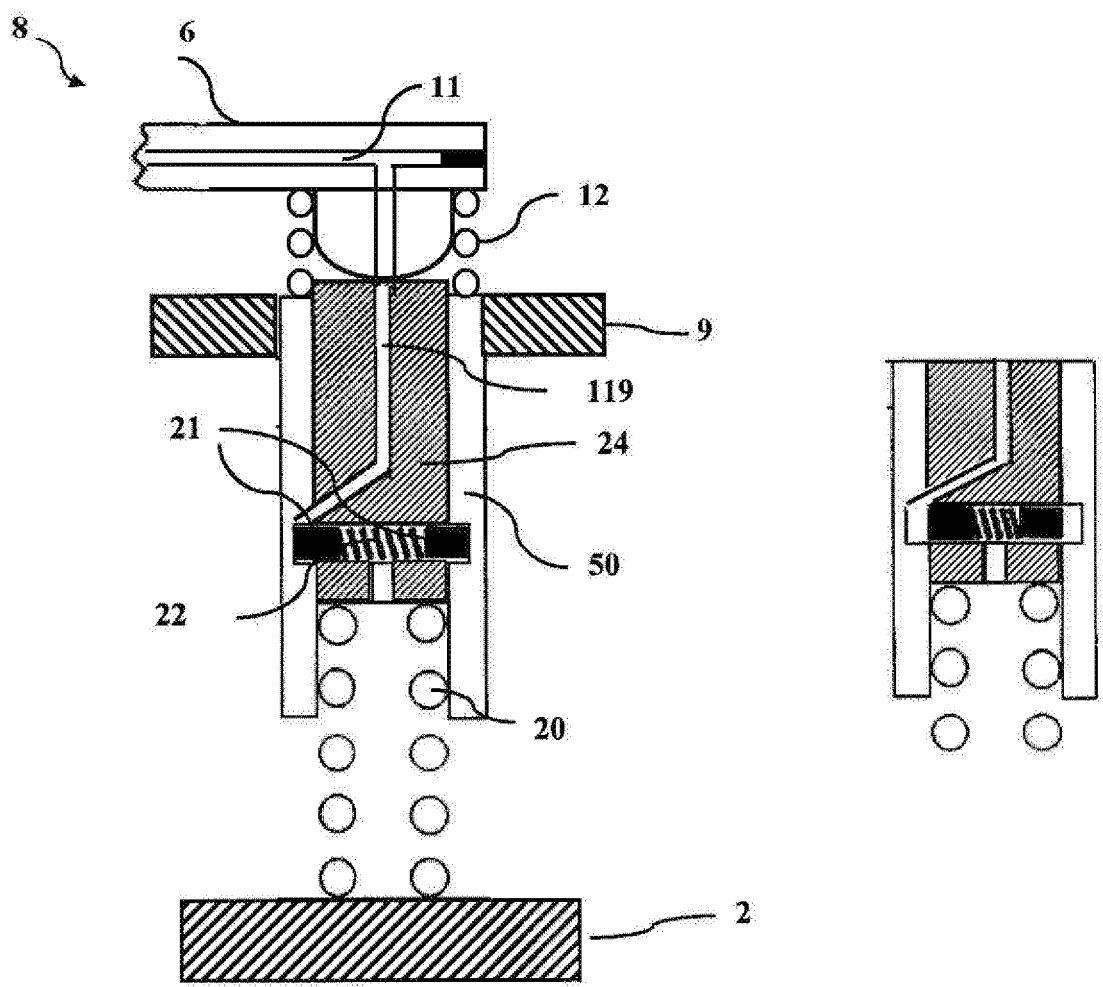
FIG. 2 shows the VBC device on a valve bridge in the locked and unlocked condition.

FIG. 2 shows details of the valve bridge collapser, VBC 8. The VBC 8 consists of driver body 24 which contains lubricating oil activation passage 119 which connects to oil passage 11 in rocker 6. The driver body 24 is moved by the motion of rocker 6 which is driven according to, cam 3. Driver body 24 drives sleeve 50 to which it is rigidly attached by pins 21. When not activated by oil pressure the pins 21 lock driver body 24 and sleeve 50 together. Pins 21 are deployed by spring 22. Sleeve 50 is rigidly attached to valve bridge 9. When driver 24 and sleeve 50 are locked together by pins 21, the valve bridge 9 provides valve lift in the normal manner.

When adequate oil pressure is applied through passage 119, the pins 21 are retracted against the force of spring 22 thereby unlocking sleeve 50 from driver body 24. The right hand portion of FIG. 2 shows the pins 21 in the unlocked condition. As a result, the movement of the driver body 24 is no longer transmitted directly to sleeve 50, but instead to drive spring 12 and return spring 20. These gradually compresses as the cam attempts to open the valves. When the combined strength of springs 12 and 20 is sufficiently weak, they are compressed as the cam attempts to open the valves, but even at the maximum lift of the cam do not exert enough force to overcome the restraining force provided by valve springs 10. The valves 9 do not open.

If spring 12 is stronger, it provides enough force part way through the lift of the cam 3 to overcome the restraining force, exerted by springs 10, and partially opens the valves 9. Thus, by selecting the strength of spring 12, the VBC 8 causes the valves 9 to open later and close earlier than that normally provided by the cam 3. When the springs 12 and 20 together are sufficiently weak, no valve motion occurs and when VBC 8 is applied to both intake and exhaust valves, the cylinder is completely deactivated. The strengths of springs 12 and 20 are selected based on: the specific design of the engine valve train (pushrod, overhead cam, component masses, flexibility, etc.), the maximum engine speed at which the VBC 8 is to be employed and the extent of telescoping motion desired.

In the present invention one objective is to provide a higher effective compression ratio for starting and other selected conditions thus allowing a lower engine design compression ratio. Another objective is to provide increased exhaust residuals to assist cold starting. Another objective is to disable valve motion totally. If both intake and exhaust valves are disabled the cylinder is deactivated. Some criteria and means are required to cause movement of latching pins 21 to cause this to occur at the proper time. In FIG. 2, the pins 21 are activated by a change in oil pressure in actuating passages 11 and 119, similar to the GM DOD system. An increase in oil pressure can be, achieved, for example, by opening a second oil feed to bearing 16 which thereby increases the oil pressure in bearing 16 and transmitted through passage 119 to withdraw pins 21. For the cold start and warm-up configuration other methods can be used. An example of a different, passive means to move pins 21 is a bi-metal spring which could bear on the pins to move them. When the engine and engine oil are cold, the bi-metal spring would cause pins 21 to be withdrawn, thus changing the effective compression ratio by allowing lost motion of the lifter. As the engine and oil warm, the bimetal spring inserts the pins 21 into lifter body 24 in a rapid, snap action manner. No further movement of pins 21 occur until the engine and oil cool below a prescribed set temperature at which condition the pins 21 retract and lost motion ensues.

The above description of moving the pins by a bi-metal spring is a passive means. Active means are also envisioned in addition to the change in oil pressure design of the GM DOD system. Such active means could be employed for any or all VBC configurations. This could be electro-magnetic activation, thermal expansion, or other active means which could be computer controlled. For active means, a computer program would provide optimum control based on, for example, temperature, emissions, engine rotational speed and load, noise and engine smoothness; and tailored to each engine and application to provide optimal valve lift and timing including cylinder deactivation.

FIG. 3a shows the effect of the present invention on an intake valve timing in the partial lift configuration. Ivo is the engine design intake valve opening and ivc the design closing angle (solid lines). Top dead center (tdc) and bottom dead center (bdc) are indicated. The CVB system causes the ivo and ivc to move according to the arrows into the dashed line positions. As shown the modified ivc is near bdc.

FIG. 3b shows the effect of the present invention on an exhaust valve timing in the partial lift configuration. Eva is the engine design exhaust valve opening and evc the design closing angle (solid lines). Top dead center (tdc) and bottom dead center (bdc) are indicated. The CVB system causes the tdc and evc to move according to the arrows into the dashed line positions. As shown the modified evc is before bdc in order to retain additional exhaust residual gases in the cylinder which assist cold starting and warm-up.

FIG. 4 shows an intake or exhaust valve lift provided by the CVB system in partial lift configuration compared to normal lift. Normal lift (solid line) starts earlier and ends, later than the dead centers, providing the usual valve lift of opening before and closing the valve after the dead center piston positions. The lower dashed curve shows the action of the CVB system. Lost motion causes later opening and earlier valve closing, thus raising the effective engine compression ratio when applied to an intake valve and trapping additional exhaust residual gases when applied to an exhaust valve. The effective compression ratio is raised to the engine design ratio by closing the intake valves 7 near bottom dead center, bdc, although a lesser compression ratio increase is possible based on the strength of the spring 12. In partial lift mode the exhaust valves would open near bottom center and might close about 10 to 20 degrees before top center. The gradual ramps 25 in the partially deactivated mode are provided by the optional damper 83 and within VBC 8. The maximum lift with the CPS activated is lower than the design lift and the difference is indicated by the arrow marked reduced lift. Lower lift does not reduce the filling of the cylinder under the low speed, colds start conditions where the CVB is employed. Lower lift combined with early exhaust valves closing work together to trap additional exhaust residual gases to further assist cold starting.

Figure 5:
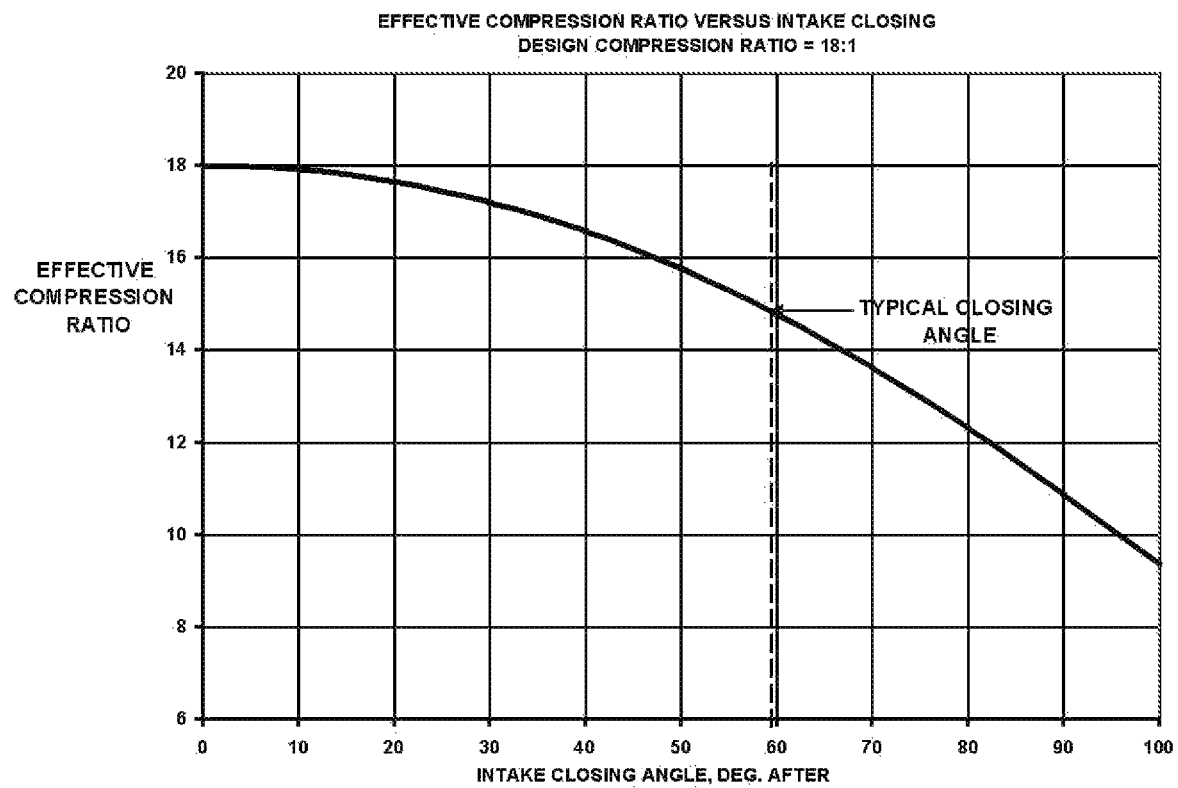
FIG. 5 shows the effective compression ratio for various intake valve closing angles for an engine with a design compression ratio of 18:1.

FIG. 5 shows, as an example, the effective compression ratio with various intake valves closing angles for a Diesel engine with a design compression ratio of 18:1. Many engines have intake valves closing 60 degrees after bottom center as the line labeled TYPICAL CLOSING ANGLE indicates. For this condition, the effective compression ratio is slightly below 15:1 for a design compression ratio of 18:1. Using the CVB system, the design compression ratio could be reduced, possibly as low as 15:1 without loss of cold start, capability.

With the embodiment providing total valve disablement and cylinder deactivation, fuel economy may be improved 20% or more under light and moderate load such as idling, surveillance operation or moderate on-road vehicle operation together with reduced emissions. With the embodiment providing reduced valve lift and lower compression ratio, fuel economy may be improved 20% or more under light and moderate load such as idling or surveillance operation together with reduced emissions and increased pressure boost.

For the purposes of this disclosure, an engine which utilizes the Miller Cycle is, an internal-combustion engine as defined in U.S. Pat. No. 2,400,247. U.S. Pat. No. 2,400,247 is herein incorporated by reference in its entirety.

Although embodiments have been described above with reference to the accompanying drawings, those of skill in the art will appreciate that variations and modifications may be made without departing from the scope thereof as defined by the appended claims.

What is claimed is:

1. A collapsible valve bridge actuation system configured to alter a lift of poppet valves in a reciprocating piston machine cylinder, the collapsible valve bridge actuation system comprising:
   a rocker arm configured to be actuated by a cam lobe; and
   a valve bridge that is functionally attached to the rocker arm configured to be actuated by the cam lobe, wherein the valve bridge comprises a collapsing device on which the rocker arm bears, the collapsing device comprising a deactivation assembly that contains controllable, deployable lock pins activated by an activation means within a housing and springs, wherein the controllable, deployable lock pins are normally engaged and only withdrawn when the activation means is applied, further wherein the collapsing device is configured to remain rigid when the controllable, deployable lock pins are engaged, further wherein the collapsing device is configured to partially or fully collapse when the controllable, deployable lock pins are retracted, further wherein an extent of collapse is a function of a strength of the springs, and further wherein the valve bridge with collapsing device is functionally attached to the poppet valves.

2. The collapsible valve bridge actuation system of claim 1, wherein the activation means is an oil pressure.

3. The collapsible valve bridge actuation system of claim 1, wherein the activation means comprises a thermal expansion mechanism.

4. The collapsible valve bridge actuation system of claim 1, wherein the activation means comprises a bi-metal spring.

5. The collapsible valve bridge actuation system of claim 1, wherein the activation means comprises an electromagnetic mechanism.

6. The collapsible valve bridge actuation system of claim 1, further comprising a damper that is functionally attached to the rocker arm and configured to slow a rate at which the poppet valves close.

* * * * *